United States Patent
Hoogerbrugge et al.

(10) Patent No.: US 6,658,655 B1
(45) Date of Patent: Dec. 2, 2003

(54) METHOD OF EXECUTING AN INTERPRETER PROGRAM

(75) Inventors: Jan Hoogerbrugge, Eindhoven (NL); Alexander Augusteijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/455,130

(22) Filed: Dec. 6, 1999

(30) Foreign Application Priority Data

Dec. 8, 1998 (EP) .............................. 98204163

(51) Int. Cl.[7] ................................ G06F 9/45
(52) U.S. Cl. ...................... 717/139; 717/134; 717/136; 717/140; 712/22; 712/23; 712/24; 712/205; 712/208
(58) Field of Search .................. 717/139, 140, 717/136, 134, 138, 149, 127, 148, 150, 151, 160; 712/1, 209, 241, 235, 22–24, 205–208

(56) References Cited

U.S. PATENT DOCUMENTS

| | | | | |
|---|---|---|---|---|
| 5,179,734 A | * | 1/1993 | Candy et al. .................... 712/1 |
| 5,299,321 A | * | 3/1994 | Iizuka ......................... 712/212 |
| 5,317,743 A | * | 5/1994 | Imai et al. .................... 717/160 |
| 5,404,469 A | * | 4/1995 | Chung et al. ................. 712/215 |
| 5,669,000 A | * | 9/1997 | Jessen et al. ................. 717/227 |
| 5,712,996 A | * | 1/1998 | Schepers ..................... 712/216 |
| 5,721,854 A | * | 2/1998 | Ebcioglu et al. ............. 712/203 |
| 5,774,727 A | * | 6/1998 | Walsh et al. ................. 717/150 |
| 5,889,996 A | * | 3/1999 | Adams ........................ 717/139 |
| 5,925,123 A | * | 7/1999 | Tremblay et al. ........... 712/212 |
| 6,021,273 A | * | 2/2000 | Griesemer ................... 717/148 |
| 6,031,992 A | * | 2/2000 | Cmelik et al. ............... 717/138 |
| 6,085,315 A | * | 7/2000 | Fleck et al. .................. 712/241 |
| 6,139,199 A | * | 10/2000 | Rodriguez ................... 717/159 |
| 6,205,578 B1 | * | 3/2001 | Grove ......................... 717/118 |
| 6,256,784 B1 | * | 7/2001 | Grove ......................... 717/139 |
| 6,324,639 B1 | * | 11/2001 | Heishi et al. ................ 712/212 |
| 6,324,686 B1 | * | 11/2001 | Komatsu et al. ............ 717/148 |
| 6,349,377 B1 | * | 2/2002 | Lindwer ....................... 712/22 |
| 6,397,379 B1 | * | 5/2002 | Yates et al. .................. 717/140 |
| 6,446,192 B1 | * | 9/2002 | Narasimhan et al. ......... 712/29 |

OTHER PUBLICATIONS

TITLE: An architectural framework for migration from CISC to higher performance platforms, author: Silberman et al, ACM, 1992.*
TITLE: Software pipelining: an effective scheduling technique for VLIW machines, author: M. Lam, ACM, 1988.*

(List continued on next page.)

*Primary Examiner*—Gregory Morse
*Assistant Examiner*—Chameli C. Das (57) ABSTRACT

A threaded interpreter (916) is suitable for executing a program comprising a series of program instructions stored in a memory (904). For the execution of a program instruction the threaded interpreter includes a preparatory unit (918) for executing a plurality of preparatory steps making the program instruction available in the threaded interpreter, and an execution unit (920) with one or more machine instructions emulating the program instruction. According to the invention, the threaded interpreter is designed such that during the execution on an instruction-level parallel processor of the series of program instructions machine instructions implementing a first one of the preparatory steps are executed in parallel with machine instructions implementing a second one of the preparatory steps for respective ones of the series of program instructions.

3 Claims, 5 Drawing Sheets

OTHER PUBLICATIONS

TITLE: A VLIW architecture for a trace scheduling compiler, author: Colwell et al, ACM, 1987.*

TITLE: Exploiting heterogeneous parallelism on a multithreaded multiprocessor, Authors: Alverson et al. 1992, ACM.*

Title: A parallel virtual machine for efficient scheme compilation, authors: Feeley et al, 1990, ACM.*

TITLE: Efficient Instruction Cache Simulation And Execution Profiling With A Threaded–code Interpreter, author: Magnusson, P.S., IEEE.*

TITLE: Threaded Code Interpreter for Object Code, Source: IBM Tech Bul, Mar. 1986.*

"Interpretation Techniques", by Paul Klint, Software–Practice and Experience, vol. 11, 963–973 (1981).

"Instruction–Level Parallel Processing: History, Overview, and Perspective", by B. Ramakrishna Rau, et al, The Journal of Supercomputing, pp. 9–50 (1993).

Textbook "compiler" Principles, Techniques and Tools, by Alfred V. Aho et al, Addison–Wesley Series in Computer Science, 1985, Sec. 10.4, pp. 602–608.

Soo–Mook Moon et al: "An Efficient Resource–Constrained Global Scheduling Technique For Superscalar and VLIW", SIGMICRO Newsletter, US, IEEE Computer Society Press, vol. 23, NR. 1/02 pp. 55–71.

Frank G. Pagan: "Converting Interpreters Into Compilers" Software Practice & Experience, GB, John Wiley & Sons LTD vol. 18, No. 6, Jun. 1998, pp. 513 line 4, p. 515, line 24.

Hoogerbrugge J. et al: "A Code Compression System Based on Pipelined Interpreters" Software Practice & Experience, GB, John Wiley & Sons LTD. vol. 29, No. 11, Sep. 1999, pp. 1005–1023.

* cited by examiner

METHOD OF EXECUTING AN INTERPRETER PROGRAM

BACKGROUND OF THE INVENTION

The invention relates to a method of executing a threaded interpreter for interpreting a program comprising a series of program instructions, the method comprising for the execution of each program instruction: a plurality of preparatory steps making the program instruction available in the threaded interpreter, and an execution step emulating the program instruction.

The invention also relates to a system for executing a threaded interpreter interpreting a program comprising a series of program instructions, the system comprising: a memory for storing the series of program instructions, and the threaded interpreter comprising a preparatory unit for executing a plurality of preparatory steps making a particular program instruction available in the threaded interpreter, and an execution unit for emulating the particular program instruction.

The invention also relates to a data carrier comprising a threaded interpreter for interpreting a program comprising a series of program instructions, the threaded interpreter comprising: a preparatory unit for executing a plurality of preparatory steps making a particular program instruction available in the threaded interpreter, and an execution unit for emulating the particular program instruction.

The invention also relates to a system for generating an executable interpreter for interpreting a program comprising a series of program instructions, the system comprising a compiler for translating the interpreter from a source code into machine instructions, the interpreter in the source code comprising: a-preparatory unit for executing at least one preparatory step making one of the program instructions available in the interpreter, and an execution unit with an emulation code for emulating one of the program instructions.

The invention also relates to a data carrier comprising a compiler for generating an executable interpreter for interpreting a program comprising a series of program instructions, the compiler being arranged to translate the interpreter from a source code into executable machine instructions, the interpreter in the source code comprising: a preparatory unit for executing at least one preparatory step making one of the program instructions available in the interpreter, and an execution unit with emulation code for emulating one of the program instructions.

It is known to execute a program by means of an interpreter. Interpretation is a program execution technique where, as opposed to the execution techniques using a compiler, the program is not translated in advance into a form suitable for direct execution by a specific processor. The program to be executed is described in a standard form which is not dedicated to a specific processor. An interpreter, being a program specific for the processor at hand, reads a program instruction of the program to be executed and analyses this program instruction. Subsequently, the interpreter determines what actions must be taken and has these actions executed by the processor. Reading a program instruction and execution of the corresponding machine instructions are carried out in an alternating fashion, without storing the translated program instructions in an intermediate format. A program instruction has an operation code that indicates the type of operation to be carried out, e.g. an add operation. Furthermore, a program instruction may have one or immediate arguments following the operation; they are operands for the operation. Suitable examples of a standard form in which the program to be interpreted can be described are the Java byte code and the P-code into which a Pascal program is translated.

Program execution on the basis of interpretation of the program to be executed is slower than on the basis of a compiled program. In the latter case, the program is translated in advance and stored in the form of machine instructions directly executable by the processor. In case of interpretation, at least the final phase of the translation is done at runtime by the interpreter running on the processor and using resources and time of the processor. This makes the execution of a program on the basis of an interpreter slower. The article 'Interpretation Techniques', Paul Klint, Software—Practice and Experience, Vol. 11, pages 963–973, September 1981, describes a so-called threaded interpreter, which is a relatively fast interpreter that does not require techniques which are costly in respect of memory. A threaded interpreter contains a block of machine instructions for each of the program instructions to be interpreted and executed. Such a block contains the following elements:

emulation code for the program instruction, i.e. one or more machine instructions to be executed by the processor for realizing the purpose of the program instruction;

a fetch instruction for fetching the next program instruction to be executed;

a decode instruction for decoding that program instruction after it has been fetched;

a jump to the block of that program instruction.

The threaded interpreter can be seen as several of these blocks in parallel. The threaded interpreter has a block for each kind of program instruction that has to be interpreted, e.g. 256 blocks when 256 different program instructions are supported. After the execution of a certain block, a jump is made to the block implementing the next program instruction to be executed. Then this block is executed and again a jump is made to the block of the then next program instruction and so on.

SUMMARY OF THE INVENTION

It is an object of the invention to provide a method of the kind set forth which is comparatively faster than the known method. This object is achieved according to the invention in a method which is characterized in that during the execution of the interpreter on an instruction-level parallel processor machine instructions implementing a first one of the preparatory steps are executed in parallel with machine instructions implementing a second one of the preparatory steps for respective ones of the series of program instructions. Executing the machine instructions for two of the preparatory steps in parallel, each step being executed for its own program instruction, makes that at least two different program instructions are being executed simultaneously. This significantly improves the speed of program execution, because it is no longer necessary to execute all required machine instructions in a single and hence longer sequence.

Parallel processing of instructions is known per se. It is described, for example, in the article 'Instruction-Level Parallel Processing: History, Overview, and Perspective', B. Ramakrishna Rau and Joseph A. Fisher, The Journal of Supercomputing, 7, pages 9–50, May 1993. In particular page 19 of that article describes instruction-level parallel processing on a VLIW (Very Long Instruction Word) processor. Such a processor has a number of slots and an instruction may be placed in each slot. The instructions together form the so-called very long instruction word, which is executed by the processor as a single (very long) instruction. This results in the parallel processing of the individual instructions placed in the respective slots. It is the task of the compiler to identify which of the instructions are independent from each other and may be carried out in parallel. These instructions are thus candidates to be placed together in respective slots. An important aspect of this task of the compiler is the identification of loops in the execution of the program instructions and to move program instructions inside the loop. The purpose is to identify which of the instructions is independent from the others and is, therefore, a candidate to be executed in parallel with the others.

The textbook 'Compiler: Principles, Techniques and Tools', Alfred V. Aho, Ravi Sethi, and Jeffrey D. Ullman, Addison-Wesley Series in Computer Science, Addison-Wesley Publishing Company, Reading, Mass., 1985, describes on pages 602 to 608 how loops in a program code are to be treated for program code optimization by the compiler. To enable optimization by the compiler, there should be no jump into the middle of a loop from the outside. The only entry into a loop is then via its header. According to the textbook, the control flow edges of a loop can be partitioned into back edges and forward edges. A back edge has the property of pointing to an entry block of the loop and the forward edges are the remaining edges. A loop can be optimized if its forward edges form an acyclic graph, i.e. a graph with no further loops. The structure of a threaded interpreter can thus be seen as a control flow graph comprising a complex arrangement of loops. Through each block, a loop may pass and after that block the loop may continue at each of the blocks, after which it may continue again at each of the blocks and so on. All control flow edges are forward edges and do not form an acyclic graph. Therefore, this control flow graph of the interpreter can not be optimised by the known software pipeline algorithms disclosed in the textbook. Despite this teaching, the inventors have found that some of the preparatory steps of a threaded interpreter can be executed in parallel as described above.

An embodiment of the method according to the invention is defined in claim 1. In this embodiment, the machine instructions implementing the steps for interpreting the series of program instructions are executed in a three-stage pipeline. This means that three program instructions are interpreted in parallel; this significantly reduces the time needed to interpret and execute the program An embodiment of the method according to the invention is defined in claim 1. A byte code format is very suitable for describing and storing the program to be interpreted. The byte code format allows for easy retrieval and analysis of the program instruction, resulting in a simpler interpreter.

It is a further object of the invention to provide a system for executing an interpreter of the kind set forth which allows faster execution than the known system. This object is achieved according to the invention by a system for executing a program that is characterized in that the threaded interpreter is arranged to have machine instructions implementing a first one of the preparatory steps executed on an instruction-level parallel processor in parallel with machine instructions implementing a second one of the preparatory steps for respective ones of the series of program instructions. Since the machine instructions implementing two steps in the interpretation of the series of program instructions are carried out in parallel on the instruction-level parallel processor, the execution of the interpreter is faster.

The data carrier comprising the threaded interpreter according to the invention is characterized in that the threaded interpreter is arranged to have machine instructions implementing a first one of the preparatory steps executed on an instruction-level parallel processor in parallel with machine instructions implementing a second one of the preparatory steps for respective ones of the series of program instructions.

It is a further object of the invention to provide a system for generating an interpreter of the kind set forth, which interpreter is suitable for faster execution of a program than the known interpreter. This object is achieved according to the invention by a system for generating an interpreter that is characterized in that the compiler is arranged to generate, for a particular program instruction by means of code duplication in the executable interpreter, a block comprising a translation into machine instructions of the execution unit for this particular program instruction, followed by a translation into machine instructions of the preparatory unit for a successor program instruction immediately succeeding the particular program instruction so as to obtain the executable interpreter in a threaded form. The system generates the executable threaded interpreter from a source code that does not comprise this threaded structure. This allows the source code to be written in the standard programming language ANSI C.

A version of the method according to the invention is defined in claim 3. Since the generated interpreter is arranged to carry out the machine instructions implementing two of the preparatory steps in parallel on an instruction-level parallel processor, two different program instructions are executed simultaneously during the execution of a program by this interpreter. This significantly reduces the time needed to execute the interpreter interpreting the program.

The data carrier comprising the compiler according to the invention is characterized in that the compiler is arranged to generate, for a particular program instruction by means of code duplication in the executable interpreter, a block comprising a translation into machine instructions of the execution unit for this particular program instruction, followed by a translation into machine instructions of the preparatory unit for a successor program instruction immediately succeeding the particular program instruction so as to obtain the executable interpreter in a threaded form.

Further advantageous embodiments of the invention are recited in the dependent Claims.

BRIEF DESCRIPTION OF THE INVENTION

The invention and its attendant advantages will be further elucidated with the aid of exemplary embodiments and the accompanying schematic drawings; therein.

Corresponding features in the various Figures are denoted by the same references.

DETAILED DESCRIPTION OF THE PREFERRED EMBODIMENT

Figure 1:
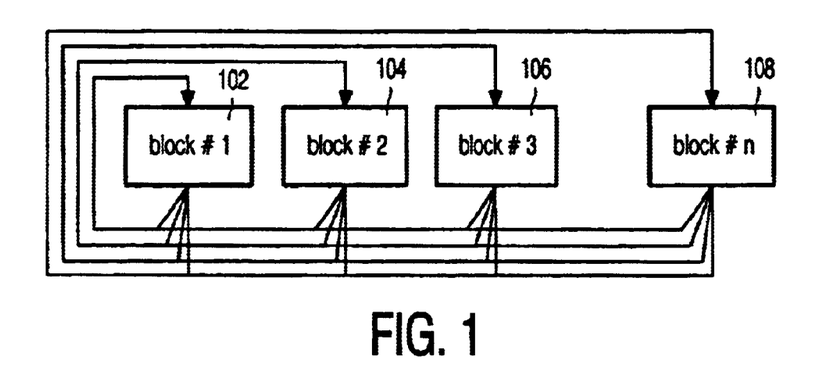
FIG. 1 shows the control flow graph of a threaded interpreter.

FIG. 1 shows the control flow graph of a threaded interpreter. The threaded interpreter has a number of blocks, of which the blocks 102, 104, 106 and 108 are shown in the graph. A block corresponds to a particular type of program instruction that can be interpreted by the interpreter and comprises a number of machine instructions to be executed by the processor. The threaded interpreter has a block for every type of program instruction that is supported. When a given program instruction is to be interpreted, control is passed to the block corresponding to the given type of program instruction, e.g. to block 106, and that block is executed. At the end of the execution of that block, it is determined which program instruction is to be carried out next and control is passed to the block corresponding to the type of that next program instruction, e.g. to block 102. It is a characteristic of the threaded interpreter that at the end of any block control may be passed to any of the other blocks.

The contents of a block of the interpreter depends on the nature of the storing of the program instructions, i.e. the format in which they are stored, and on the processor on which the interpreter runs. However, in a block of the threaded interpreter the following elements can be distinguished:

- one or more machine instructions emulating the program instruction, i.e. machine instructions that realize the purpose of the program instruction;
- a fetch instruction for fetching the next program instruction from the memory;
- a decode instruction for decoding the fetched program instruction so that the type of program instruction is determined;
- a jump instruction to the block corresponding to the type of program instruction.

In the preferred embodiment of the invention, the program instructions are stored in a so-called byte code format. According to such a format a program instruction is uniquely coded into a code that fits in a single byte. This byte code indicates the type of operation and may be followed by one or more immediate arguments indicating the operands of the instruction. The fetch and decode instructions are implemented in such a way that they can handle program instructions stored in a byte code format. Application of the invention, however, is not restricted to programs stored in a byte code format. In the case of a different format, the implementation of the fetch and decode instruction must accommodate this different format. The table below shows an example of the block for the program instruction for multiplication. The example concerns a byte code format and is given in a pseudo assembly language.

TABLE I

Implementation of a block of the threaded interpreter

| | |
|---|---|
| MUL tos, nos → tos | //machine instruction for multiplication |
| LDB pc++ → bc | //fetch next byte code and increment program counter |
| LDW table(bc) → block | //decode the fetched byte code |
| JMP block | //jump to next block |

The left column contains the machine instructions in pseudo assembly language and the right column contains comments on the individual instructions. The first row is the machine instruction emulating the program instruction. This is the multiplication of the element at the top of the stack by the next element on the stack and the result is put on top of the stack. The second row is the fetch instruction for fetching the next program instruction. The byte that is indicated by the program counter pc is loaded from the memory and put in the variable bc and the program counter is incremented to prepare for the next program instruction. The third row is the decode instruction for decoding the fetched program instruction. For decoding, us is made of an array containing the addresses of the various blocks of the interpreter. The fetched byte, having a value of between 0 and 255, is used as an index for the array and the indexed word is loaded into the variable block. The fetch and decode instructions are very simple due to the fact that the program instructions are stored in the memory as byte codes. The fourth row is the jump instruction to the block corresponding to the next program instruction.

Figure 2:
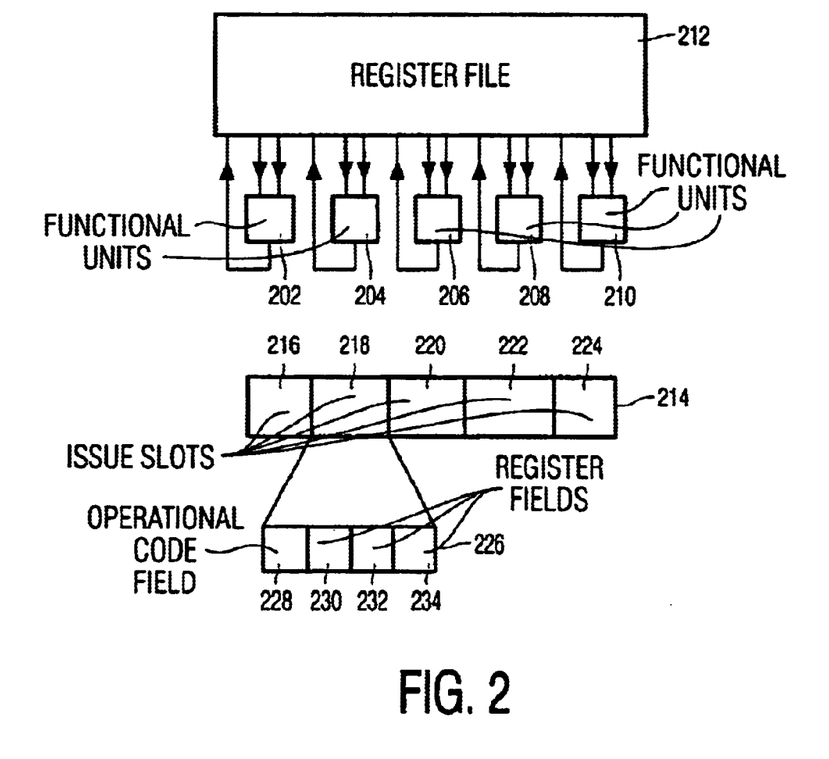
FIG. 2 schematically shows a part of a Very Long Instruction Word processor.

FIG. 2 schematically shows a part of a Very Long Instruction Word processor. In this example, the processor has five functional units, 202–210, which are capable of carrying out operations in parallel with respect to each other. The processor also has a number of registers which are symbolically grouped in a register file 212. For the execution of an operation, a functional unit can use the contents of two registers of the register file as input and store the result of the operation in one of the registers of the register file. The functional units of a VLIW processor may be uniform in that each of the functional units can carry out each of the supported operations. However, the functional units may also be non-uniform in that a certain functional unit can only carry out a class of the available operations while another functional unit can carry out only a different class. An example in this respect is the situation where one functional unit is arranged for memory-related operations and another functional unit is arranged for arithmetic operations.

A Very Long Instruction Word (VLIW) instruction, symbolized by block 214, has five issue slots in which an operation to be carried out by a functional unit can be placed. The position of an issue slot in the VLIW instruction determines which of the functional units is to carry out the operation placed in that issue slot. In the example shown, an operation placed in issue slot 216 will be carried out by functional unit 202, an operation in issue slot 218 by functional unit 204, an operation in issue slot 220 by functional unit 206, an operation in issue slot 222 by functional unit 208, and an operation in issue slot 224 by functional unit 210. An operation placed in an issue slot, like operation 226, has an operation code field 228 indicating the type of operation. Furthermore, the operation 226 has register fields 230 and 232 indicating the two input registers and a register field 234 indicating the output register. The VLIW processor operates in cycles, a complete VLIW instruction being processed in each cycle. This results in the parallel execution of the operations placed in the issue slots of the VLIW instruction. For some of the operations, the result is not immediately available at the start of the next cycle. So a subsequent operation needing that result cannot be scheduled immediately after such an operation. Examples of such operations for the processor used in the preferred embodiment are the load word instruction and the load byte instruction, each taking three cycles, and the jump instruction, which takes four cycles.

Figure 3:
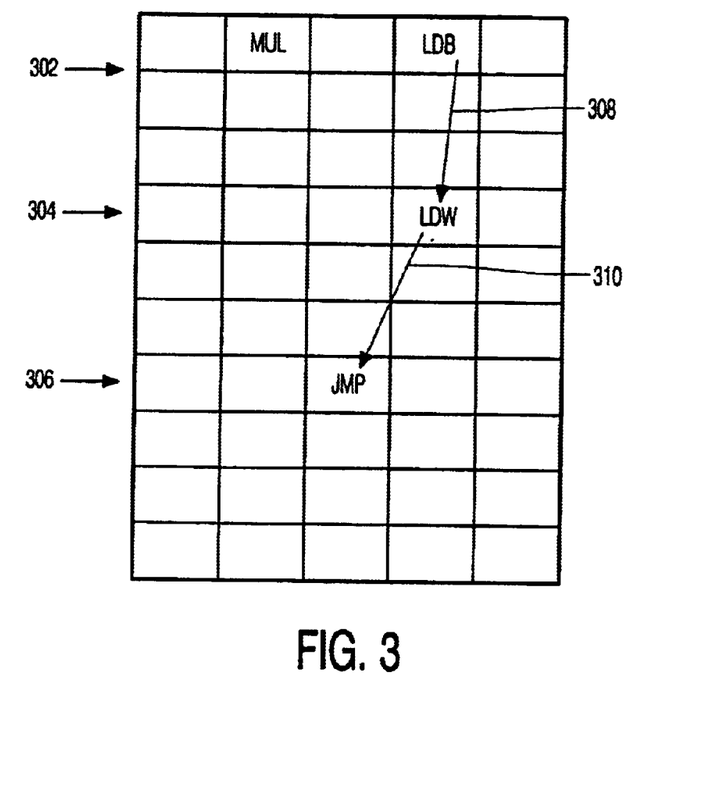
FIG. 3 schematically shows the layout of part of a program to be executed by a VLIW processor according to the known approach.

FIG. 3 schematically shows the layout of part of a program to be executed by a VLIW processor according to the known approach. The program can be viewed as a matrix wherein a row represents a VLIW instruction comprising the operations to be issued simultaneously. A specific column of the matrix represents the operations that are to be carried out by the corresponding functional unit. The order of execution is from the top row 302 down in the order as given in the matrix, unless a jump instruction imposes that another instruction is to be executed. The effect of the jump instruction, i.e. the jump to the specified address, occurs after the latency of the jump instruction has lapsed. Below, the execution of a block of the threaded interpreter on a VLIW processor will be illustrated while using the four machine instructions given in Table I. In practice, some operation other than the ones originating from that table may be scheduled in a free issue slot but this is not shown for reasons of clarity and is of no significance for explaining the invention. The MUL operation and the LDB operation can be scheduled in the first VLIW instruction since these two operations do not depend on each other. The MUL operation is the realisation of the present program instruction, whereas the LDB operation is the fetching of the next program instruction. The LDW operation cannot yet be scheduled since it requires the result of the LDB operation and the JMP operation cannot yet be scheduled since it requires the result of the LDW operation. It takes three cycles before the result of the LDB operation becomes available and, therefore, the LDW operation is issued in the fourth VLIW instruction, indicated by row 304. It takes three cycles before the result of the LDW operation becomes available. The JMP operation is, therefore, issued in the seventh VLIW instruction, indicated by row 306. Since it takes four cycles before the result of the JMP operation is effectuated, the execution of the whole block specified by table I takes at least ten cycles of the VLIW processor. On average, the operations emulating the program instruction, like the MUL operation, require two cycles each. Furthermore, for almost all program instructions the emulating operations require less than ten cycles. Therefore, one can say that the execution of a single block of the threaded interpreter requires ten cycles of the VLIW processor. The fact that the LDW operation can only be executed when the result of the LDB operation has become available and, therefore, depends on the LDB operation, is indicated by arrow 308 from the LDB operation to the LDW operation. In the same way, arrow 310 indicates that the JMP operation depends on the LDW operation.

Figure 4:
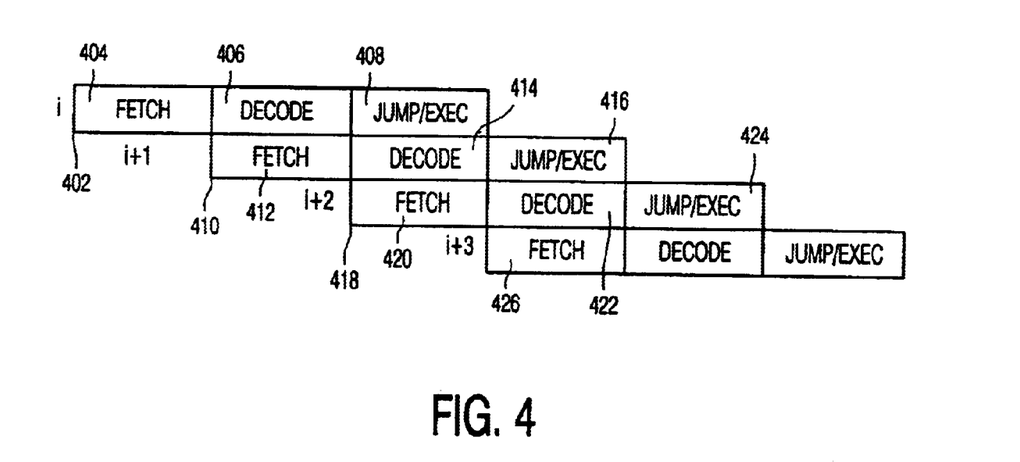
FIG. 4 shows the execution of the interpreter steps for a number of program instructions according to the invention, FIG. 5 schematically shows the layout of part of the program implementing the stages shown in FIG. 4.

FIG. 4 shows the execution of the interpreter steps for a number of program instructions according to the invention. The execution of the steps in the interpreter for interpreting a program instruction is depicted by a row. Furthermore, this execution is partitioned in a number of stages, depicted by respective fields in the row. For the $i^{th}$ program instruction, row 402 has a stage 404 for the fetch step, a stage 406 for the decode step and a stage 408 for the jump step and the execution step. It is to be noted that the execution step is intended for executing the machine instructions emulating program instruction i, whereas the fetch step, the decode step and the jump step are operating on program instruction i+1. This is in conformity with the nature of the threaded interpreter as explained in relation to FIG. 1 and Table I. Table I shows a block for a particular program instruction, in which block the particular program instruction is executed and a jump to the next program instruction is prepared and made. So in stage 404 the program instruction i+1 is fetched from the memory and in stage 406 that program instruction is decoded. In stage 408 a jump is made to the unit of machine instructions that emulates the program instruction i+1. In stage 408 the machine instructions of program instruction i are also executed. Row 410 shows the steps for the $(i+1)^{th}$ program instruction: the fetch step in stage 412, the decode step in stage 414 and in stage 416 the jump step and the execution step of the machine instructions emulating the program instruction i+1. Analogously, row 418 shows those steps for program instruction i+2 in stages 420, 422 and 424 respectively. In the figure, time is represented from left to right and the stages for a program instruction are executed from left to right, e.g. the fetch step of a program instruction is executed prior to its decode step and the decode step of a program instruction is executed prior to its jump step.

The stages that are shown above one another are carried out in parallel on a VLIW processor. So the jump and the execution step related to program instruction i of stage 408 are carried out simultaneously with the decode step related to program instruction i+1 of stage 414 and simultaneously with the fetch step relating to program instruction i+2 of stage 420. When this column of stages has been executed, the next iteration takes place, the stages 416, 422 and 426 then being executed in parallel. In these stages, the same steps as in the previous iteration are executed, but now for the successor program instructions. The rows and stages of FIG. 3 are also referred to as the pipeline of the interpreter or more particularly as the software pipeline. In the preferred embodiment, a three-stage pipeline is employed, meaning that three program instructions are being executed in parallel. The interpretation of the program instructions in a software pipeline as described above operates on the assumption that the next program instruction to be interpreted is the one that immediately succeeds the current one. In case of a jump program instruction, this assumption is not valid and the flow of interpreted program instructions will be different from the sequential order. In this case, the pipeline is initialized and operating the pipeline starts with the program instruction to which the jump has been made.

It is to be noted that the stages in FIG. 4 contain parts of program instructions that are part of the program that is being interpreted. The stages contain parts of machine instructions that are carried out by the processor. In other words, FIG. 4 shows a software pipeline during execution of the interpreter according to the invention and does not show a hardware pipeline for execution of machine instructions by a processor.

Figure 5:
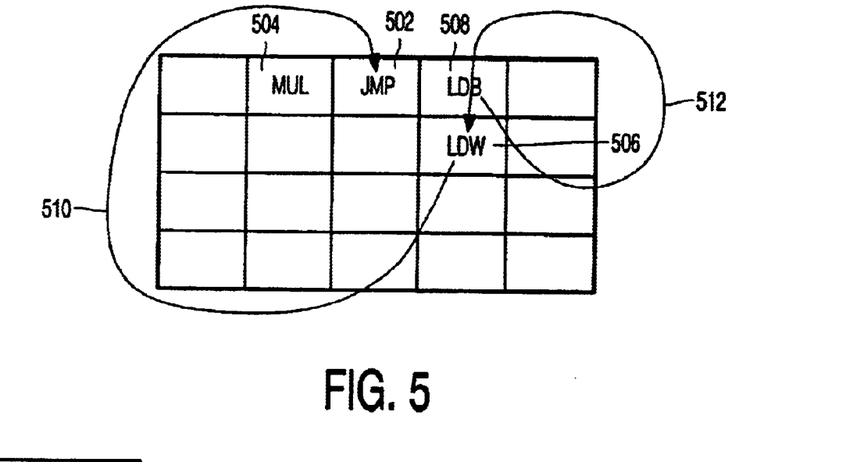

FIG. 5 schematically shows the layout of part of the program implementing the stages shown in FIG. 4. This part shows the three stages of respective program instructions that are executed in parallel, in this case being stage 408, stage 414 and stage 420. The JMP operation 502 and the MUL operation 504 are scheduled in the first VLIW instruction. These operations can be executed in parallel since they do not depend on each other. The MUL operation is the realisation of program instruction i and the JMP operation is the jump to program instruction i+1. The MUL operation and the JMP operation correspond to stage 408 of the $i^{th}$ program instruction. The JMP operation 502 takes four cycles to complete and therefore in order to complete the stage at least three cycles must follow the cycle in which the JMP operation is scheduled. The LDW operation 506 is scheduled in the second VLIW instruction and implements the decode belonging to program instruction i+1, as shown in stage 414. The LDW operation takes three cycles to complete and may, therefore, be scheduled in the first or second VLIW instruction without affecting the length of the program fragment since the JMP operation 502 takes four cycles anyway. The LDB operation 508 is scheduled in the first VLIW instruction and implements the fetch belonging to program instruction i+2, as shown in stage 420. The LDB operation takes three cycles to complete and may, therefore, be scheduled in the first or second VLIW instruction without affecting the length of the program fragment, since the JMP operation 502 takes four cycles.

To summarize the relation between the operations shown in FIG. 5 and the steps of the interpreter shown in FIG. 4 and to explicitly show on which program instructions the operations work:

- the MUL operation belongs to the execution of program instruction i and emulates program instruction i,
- the JMP operation belongs to the execution of program instruction i and jumps to the block of program instruction i+1,
- the LDW operation belongs to the execution of program instruction i+1 and decodes program instruction i+2, and
- the LDB operation belongs to the execution of program instruction i+2 and fetches program instruction i+3.

The execution of the next three stages is carried out in a next block of VLIW instructions, similar to the ones shown in FIG. 5 and operating on respective next program instructions. The JMP operation 502 is dependent on the LDW operation of a previous block of VLIW instructions and not on the LDW operation 506 of the present block. This dependence is illustrated by arrow 510, which is drawn with a loop outside the matrix to indicate dependence on a previous iteration, i.e. a previous block of VLIW instructions. Since the previous block has been completely finished prior to the start the present block, the JMP operation may be scheduled immediately at the start of the present block. In the same way, the LDW operation 506 is dependent on the LDB operation of the previous block and not on the LDB operation 508 of the present block. This dependence is indicated by arrow 512.

The operations in a single block are not dependent on each other and are scheduled in such a way that the whole block requires as few cycles of the VLIW processor as possible. In the example, the JMP operation requires four cycles to complete. The other operations, in particular the MUL operation, are finished earlier or at the latest at the same instant and therefore the whole block takes four cycles. This will be the same for other types of program instructions as well, as long as the operation or operations emulating the program instruction, such as the MUL operation in the example, require four cycles at the most. In practice, this is true for most types of program instruction. This means that the scheduling of steps and operations as shown in the FIGS. 4 and 5 has reduced the interpretation of a program instruction on a VLIW processor from ten cycles, as shown in FIG. 3, to four cycles.

The preferred embodiment of the invention concerns the execution of the threaded interpreter on the Philips VLIW processor TM 1000. However, the invention can also be carried out on another type of processor allowing machine instructions to be executed in parallel. This technique is generally called instruction-level parallel processing and such a processor is called an instruction-level parallel processor. A VLIW processor belongs to a particular subclass of the class of instruction-level parallel processors.

The interpreter in the preferred embodiment has been written in the programming language C in order to make it a portable program usable on different processors. It is not possible to directly implement a threaded interpreter in ANSI C, since this language lacks variable labels. Therefore, at the end of a block of the threaded interpreter it is not possible to implement a jump instruction to a block that is to be determined at runtime.

Therefore, the interpreter has been implemented in ANSI C by a switch statement which is contained within an endless while loop and has been compiled by a compiler that has optimized and rearranged the compiled instructions in order to obtain a threaded interpreter.

The table below shows one block of the interpreter in ANSI C.

TABLE II

Block of the interpreter for the multiply program instruction

```
while (1) {
    switch (b0) {
        ...                              //other cases
        case 0 x 4e:                     //multiply operation
            tos = tos x nos;             //emulation code
            nos = sp[2];                 //update stack cache
            sp += 1;                     //update stack pointer
            b0 = b1; b1 = b2; b2 = b3;   //shift pre-fetch pipeline
            b3 = b4; b4 = b5;
            b5 = b6; b6 = pc[7];         //pre-fetch bytes
            pc += 1;                     //update program counter
#pragma TCS-graft_here                   //to create threaded
                                         //  interpreter
            break;
        ...                              //other cases
    }}
```

The implementation as a pipelined interpreter has been realised by explicitly maintaining a set of pre-fetched bytes b0, . . . , bn in the interpreter. The argument of the interpreter switch is b0, being the byte code of the program instruction to be interpreted. The immediate arguments of that program instruction are b1, . . . , bm, where m is the number of immediate arguments the program instruction requires. In the rare case that a program instruction requires more than n byte immediate arguments, the missing m-n bytes are fetched from memory. Determining the value for n involves a trade-off between the amount of instructions required to shift the pre-fetched bytes and the chance that insufficient pre-fetching slows down the pipeline. It has been found empirically that six is a suitable value for n. After b0, . . . , bm have been used, the pre-fetch pipeline is shifted by m+1 positions and m+1 new bytes are fetched from the memory. Once bytes are pre-fetched sufficiently ahead, the compiler can move decode load operations to preceding iterations as described below. The pragma "TCS-graft_here" is an instruction to the compiler that such optimization is to be carried out there.

Figure 6:
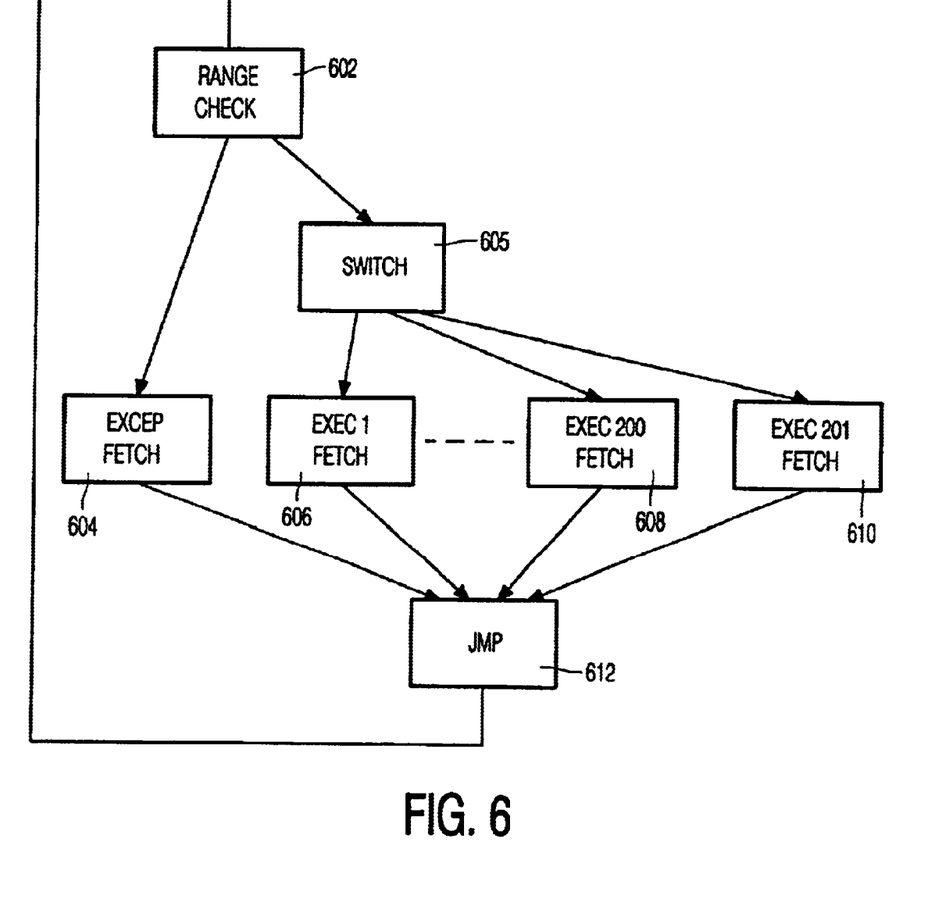
FIG. 6 shows the control flow graph of the interpreter translated from the implementation in C.

FIG. 6 shows the control flow graph of the interpreter translated from the implementation in C. A control flow graph shows the structure and the possible flows of the program translated by the compiler. The control flow graph contains basic blocks and control flow edges. A basic block contains a number of instructions, each of which is executed, in the order given, when control is passed to that basic block. A control flow edge indicates how control can be passed from one basic block to the other. Basic block 602 is the range check to verify whether the switch argument b0 corresponds to one of the cases of the switch statement. If this is not so, control passes to basic block 604 for handling this exception. If b0 has a corresponding case, control passes to basic block 605 containing the switch and after that to the basic block of the relevant case, e.g. to basic block 608. After each of the basic blocks 604 to 610, control passes to basic block 612, which is a jump back to basic block 602. This jump reflects the endless while loop as given in the C program.

Figure 7:
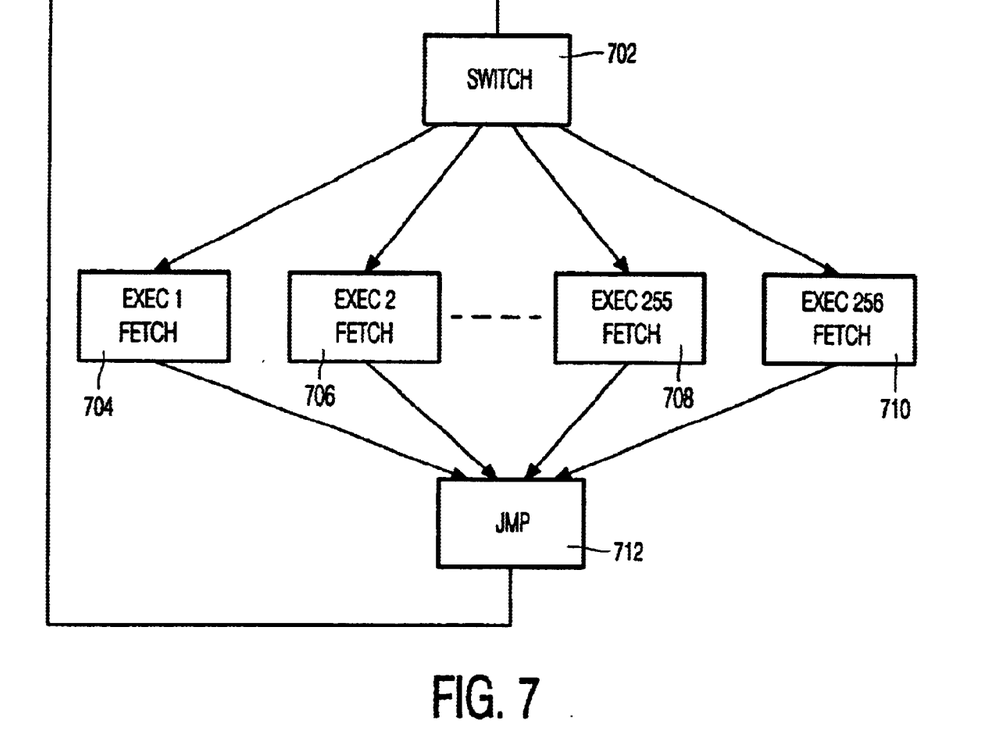
FIG. 7 shows the control flow graph of the interpreter after a first optimization.

FIG. 7 shows the control flow graph of the interpreter after a first optimization. This first optimization by the compiler can be applied if the switch contains nearly 256 cases, so if the number of types of program instruction supported by the interpreter is nearly 256. The number of cases is then increased to 256 by way of a number of dummy cases. This means that for any value of the byte code corresponding to the program instruction, a valid basic block is available in the switch and that the range check can be dispensed with. The control flow graph then directly starts with the switch in basic block 702. After that, control passes to one of the basic blocks 704 to 710 depending on the value of the byte code. As before, control then always passes to the jump in basic block 712.

Figure 8:
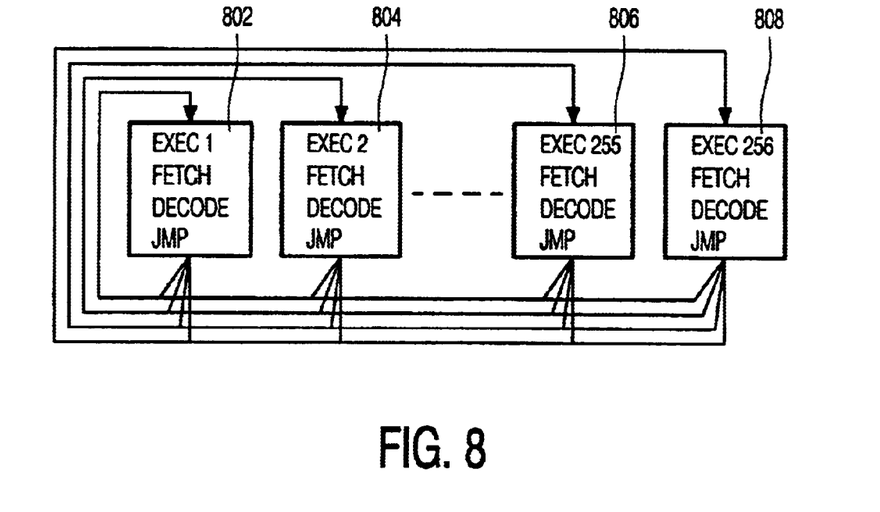
FIG. 8 shows the control flow graph of the interpreter after a further optimization.

FIG. 8 shows the control flow graph of the interpreter after a further optimization. The switch of basic block 702 is moved backwards in the loop and, together with the jump of basic block 712, added to each of the basic blocks 704 to 710. The switch plus the jump represent the decode of a program instruction and the jump to the block of that program instruction. This optimization results in a control flow graph with 256 basic blocks, of which are shown basic blocks 802 to 808, and control flow edges from each of the blocks to each of the blocks. A basic block contains the following elements:

execution of the machine instructions emulating the program instruction;

a fetch of the byte code of the next program instruction;

a decode of that byte code;

a jump to the block corresponding to the decoded program instruction.

The foregoing corresponds to the implementation of a threaded interpreter as described in relation to FIG. 1. The compiler according to the invention has thus formed a threaded interpreter from a program source code in ANSI C that did not contain the threaded structure.

For interpretation of a program comprising a series of program instructions, the basic blocks are executed repeatedly in iterations until the program terminates. In order to realize the pipelining as described with reference to FIG. 4, the compiler moves instructions from one iteration to another in a manner described below. The decode instruction is moved by the compiler to the preceding iteration. This means that the decode instruction of a block of a given program instruction relates to the program instruction which is located one position later in the series of program instructions, since the decode instruction has been moved thereto from the next block. The fetch instruction is moved back two iterations due to the pre-fetch pipeline specified in the C program above. This means that the fetch instruction of a block of a given program instruction relates to the program instruction which is located two positions later in the series of program instructions, since the fetch instruction has been moved to this block from two blocks later. Moving these instructions to the other iterations makes them independent from the instructions inside a given block. This allows the parallel processing of the instructions as described in relation to FIG. 5.

The compiler moves an instruction of a block back to the previous iteration by duplicating that instruction to all possible predecessors of the basic block at hand. In case of the threaded interpreter, this means duplicating the instruction from a particular block to all other blocks since the given block may be arrived at from each of the other blocks. Since every block is modified in this way, i.e. every block plays the role of the particular block once, each block receives multiple copies of the instruction to be moved. The instruction to be moved is the decode instruction which produces the address of the block to be jumped to next. The decode instruction receives as input a byte which is the byte code of the next program instruction. This may be the next byte in the pre-fetch pipeline or a later byte if one or more of the bytes in the pre-fetch pipeline is an immediate argument. So the exact implementation of the decode instruction of a block depends on the type of program instruction of that block, since different types may have a different number of immediate arguments; therefore, a number of different versions of the decode instruction exist among the multiple copies. The compiler removes the duplicate copies from the decode instructions that are moved to a block and only the different versions remain to be executed in that block.

Realizing the desired pipeline for executing the threaded interpreter is thus based on two features. The first feature is the pre-fetch pipeline of 6 bytes as coded in the C program, which allows moving the fetch step of a program instruction two iterations backwards. The actual moving of the fetch step is carried out by the compiler; this is a straightforward task given the pre-fetch pipeline. The second feature is moving the decode instruction of a program instruction one iteration backwards. The compiler carries out this move by duplicating the relevant machine instructions from all blocks to all other blocks and by removing the duplicate instructions from a block.

Figure 9:
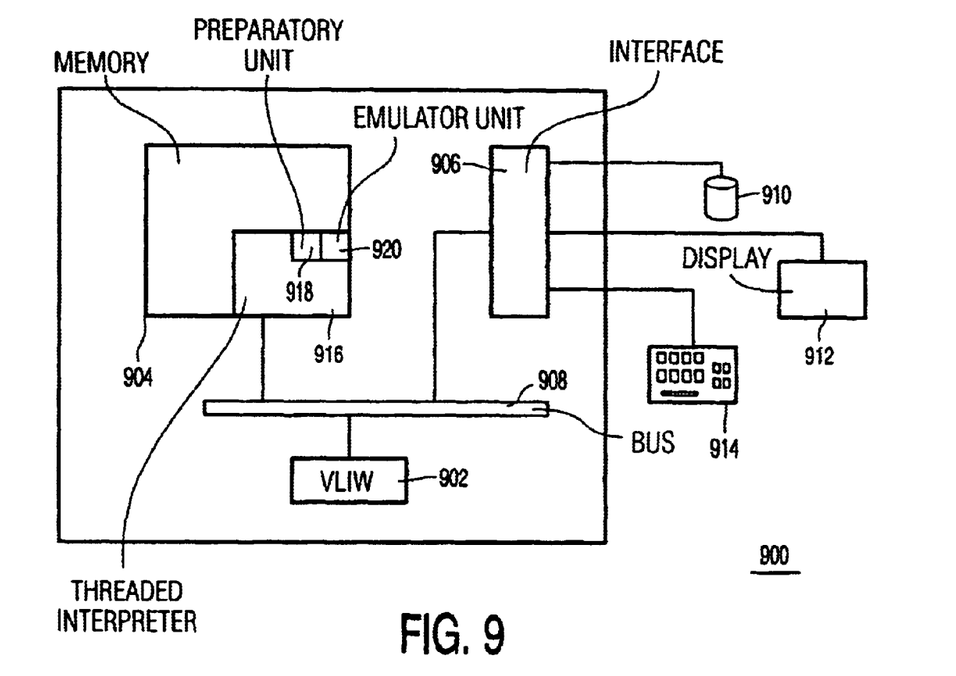
FIG. 9 shows an embodiment of the system for executing a program according to the invention.

FIG. 9 shows an embodiment of the system for executing a program according to the invention. The system 900 is implemented according to a known architecture. The system may be a workstation, a consumer apparatus like a television set, or any other type of apparatus having the required resources. The system has a VLIW processor 902 for carrying out the machine instructions of program module loaded in memory 904. This memory may be random access memory or a combination of random access memory and read only memory. The system further has an interface 906 for communication with peripheral devices. There is a bus 908 for the exchange of commands and data between the various components of the system. The peripheral devices of the system include a storage medium 910 containing the program to be interpreted. Alternatively, this program may be stored in the read only memory of the system. The storage medium 910 may be a hard disk or other suitable medium, like an optical disc, a chip card or a tape. The peripheral devices of the system further include a display 912 and an input device 914 for communicating with a user of the system. The system has a threaded interpreter 916 as described above. The interpreter has a preparatory unit 918 that is arranged to retrieve a program instruction from the memory 904 and to make it available for processing by the interpreter. Furthermore, the interpreter has a unit 920 comprising the machine instruction or instructions that emulate the retrieved program instruction. The program to be executed comprises a series of program instructions and is loaded into memory 904 for interpretation and execution by interpreter 916.

Figure 10:
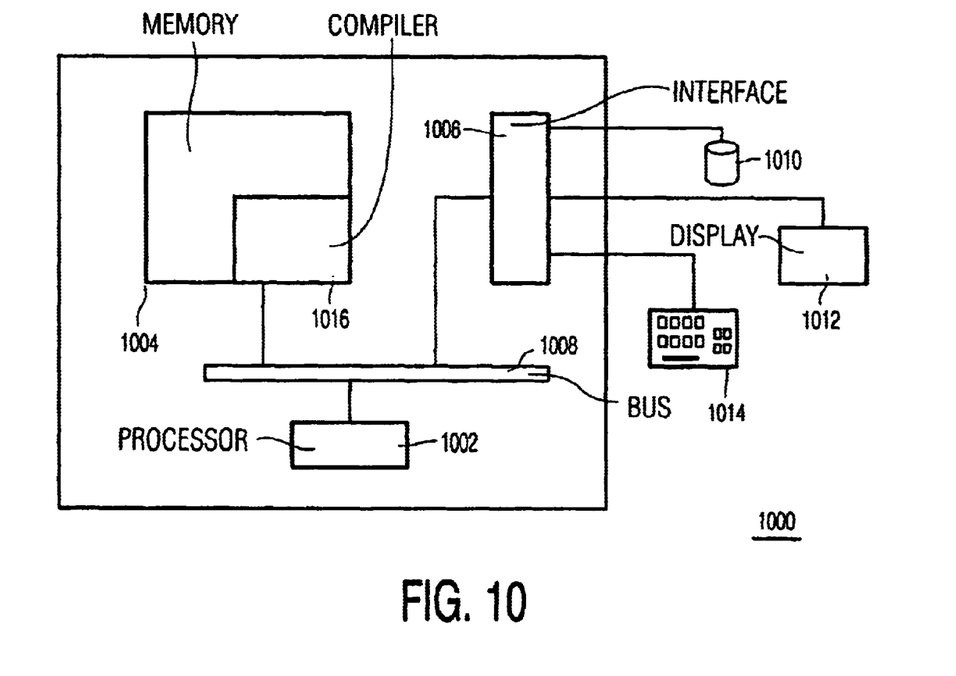
FIG. 10 shows an embodiment of the system for generating the interpreter according to the invention.

FIG. 10 shows an embodiment of the system for generating the interpreter according to the invention. The system 1000 is implemented according to a known architecture. The system is a workstation based on a general-purpose computer, but another type of computer may also be used. The system has a processor 1002 for carrying out the machine instructions of a program module loaded in memory 1004. The system also includes an interface 1006 for communication with peripheral devices. There is a bus 1008 for the exchange of commands and data between the various components of the system. The peripheral devices of the system include a storage medium 1010 containing the source of the interpreter to be compiled. The resultant executable compiler is also stored on the storage medium 1010. The storage medium 1010 may be a hard disk or other suitable medium, like an optical disc, a chip card or a tape. The peripheral devices of the system also include a display 1012 and an input device 1014 for communicating with a user of the system. The system includes a compiler 1016 as described above.

What is claimed is:

1. A system for generating an executable interpreter for interpreting a program comprising a series of program instructions, the system comprising a compiler for translating the interpreter from a source code into machine instructions, the interpreter in the source code comprising:

a preparatory unit for executing at least one preparatory step making one of the program instructions available in the interpreter, and an execution unit with emulation code for emulating one of the program instructions, characterized in that the compiler is arranged to generate, for a particular program instruction by means of code duplication in the executable interpreter, a block comprising a translation into machine instructions of the execution unit for this particular program instruction, followed by a translation into machine instructions of the preparatory unit for a successor program instruction immediately succeeding the particular program instruction so as to obtain the executable interpreter in a threaded form, wherein the compiler is arranged:

to generate the threaded interpreter arranged to be executed on an instruction-level parallel processor in repeated iterations, and to generate the threaded interpreter arranged to have machine instructions implementing a first one of the preparatory steps executed in parallel with machine instructions implementing a second one of the preparatory steps for respective ones of the series of program instructions by moving the machine instructions implementing the first one of the preparatory steps to an immediately preceding iteration.

2. A system as claimed in claim 1, wherein the compiler is arranged to move the machine instructions implementing the first one of the preparatory steps to an immediately preceding iteration for each of the blocks and wherein the compiler is arranged to remove duplicate copies of machine instructions in a particular block resulting from such moving.

3. A compiler for generating an executable interpreter for interpreting a program comprising a series of program instructions implemented in a processor, the compiler being arranged to translate the interpreter from a source code into executable machine instructions, the interpreter in the source code comprising:

a preparatory unit for executing at least one preparatory step making one of the program instructions available in the interpreter, and an execution unit with an emulation code for emulating one of the program instructions, characterized in that the compiler is arranged to generate, for a particular program instruction by means of code duplication in the executable interpreter, a block comprising a translation into machine instructions of the execution unit for this particular program instruction, followed by a translation into machine instructions of the preparatory unit for a successor program instruction immediately succeeding the particular program instruction, so as to obtain the executable interpreter in a threaded form, wherein the compiler is arranged:

to generate the threaded interpreter arranged to be executed on an instruction-level parallel processor in repeated iterations, and to generate the threaded interpreter arranged to have machine instructions implementing a first one of the preparatory steps executed in parallel with machine instructions implementing a second one of the preparatory steps for respective ones of the series of program instructions by moving the machine instructions implementing the first one of the preparatory steps to an immediately preceding iteration.

* * * * *